US011882119B2

(12) United States Patent
Masuda et al.

(10) Patent No.: US 11,882,119 B2
(45) Date of Patent: Jan. 23, 2024

(54) COMMUNICATION SYSTEM, CRYPTOGRAPHIC KEY DISTRIBUTION METHOD, MANAGEMENT COMMUNICATION APPARATUS, AND COMMUNICATION APPARATUS

(71) Applicant: PANASONIC INTELLECTUAL PROPERTY MANAGEMENT CO., LTD., Osaka (JP)

(72) Inventors: Yoichi Masuda, Osaka (JP); Kenji Kuramae, Kanagawa (JP); Masao Akimoto, Chiba (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 536 days.

(21) Appl. No.: 17/264,237

(22) PCT Filed: Jul. 1, 2019

(86) PCT No.: PCT/JP2019/026020
§ 371 (c)(1),
(2) Date: Jan. 28, 2021

(87) PCT Pub. No.: WO2020/026669
PCT Pub. Date: Feb. 6, 2020

(65) Prior Publication Data
US 2021/0320921 A1 Oct. 14, 2021

(30) Foreign Application Priority Data
Jul. 31, 2018 (JP) .................. 2018-143236

(51) Int. Cl.
*G06F 7/04* (2006.01)
*H04L 9/40* (2022.01)

(52) U.S. Cl.
CPC ........ *H04L 63/0876* (2013.01); *H04L 63/062* (2013.01)

(58) Field of Classification Search
CPC ..... H04L 63/0876; H04L 9/08; H04L 9/0819; H04L 9/083; H04L 63/06; H04L 63/062;
(Continued)

(56) References Cited

U.S. PATENT DOCUMENTS 7,072,339 B2 * 7/2006 Tsuchiya ............. H04L 61/2542
370/466
8,130,712 B1 * 3/2012 Bennett, III .......... H04L 67/143
370/329
(Continued)

FOREIGN PATENT DOCUMENTS

JP 2006-324946 A 11/2006
JP 2007-053530 A 3/2007
(Continued)

OTHER PUBLICATIONS

Brutch et al, Mutual Authentication, Confidentiality and Key Management (MACKMAN) System for Mobile Computing and Wireless Communication, IEEE, Dec. 11, 1998, pp. 1-10. (Year: 1998).*
(Continued)

*Primary Examiner* — Philip J Chea
*Assistant Examiner* — Jenise E Jackson
(74) *Attorney, Agent, or Firm* — Rimon P.C.

(57) ABSTRACT

The communication system is a communication system including a management communication apparatus, a first communication apparatus, and a second communication apparatus. The first communication apparatus is capable of communicating using a plurality of Internet Protocol (IP) addresses in different versions from each other, and includes a first communication unit configured to notify the management communication apparatus of a first IP address among
(Continued)

the plurality of IP addresses in a first authentication process for entering the communication system, and to notify the management communication apparatus of a second IP address among the plurality of IP addresses after the first authentication process, the first authentication process being performed between the first communication apparatus and the management communication apparatus.

16 Claims, 7 Drawing Sheets

(58) Field of Classification Search
CPC ......... H04L 63/08; H04L 12/04; G06F 21/35; G06F 21/44; G06F 21/606; H04W 12/0431; H04W 12/0471; H04W 12/06
See application file for complete search history.

(56) References Cited

U.S. PATENT DOCUMENTS

| | | | |
|---|---|---|---|
| 8,151,325 B1* | 4/2012 | Bennett, III | H04L 69/167 |
| | | | 713/168 |
| 8,300,637 B1* | 10/2012 | Bennett, III | H04L 61/5014 |
| | | | 370/466 |
| 2003/0061380 A1* | 3/2003 | Saito | H04L 12/2803 |
| | | | 709/223 |
| 2004/0111494 A1* | 6/2004 | Kostic | H04L 69/18 |
| | | | 709/249 |
| 2006/0067360 A1* | 3/2006 | Ohara | H04L 69/18 |
| | | | 370/465 |
| 2007/0067431 A1 | 3/2007 | Yoshihara et al. | |
| 2008/0098098 A1* | 4/2008 | Onsen | H04L 63/101 |
| | | | 709/222 |
| 2009/0103126 A1* | 4/2009 | Park | H04L 61/5046 |
| | | | 358/1.15 |
| 2014/0079066 A1* | 3/2014 | Tseng | H04L 61/2557 |
| | | | 370/392 |
| 2015/0066979 A1* | 3/2015 | Zhang | G06F 16/245 |
| | | | 707/769 |
| 2015/0195199 A1* | 7/2015 | Suryavanshi | H04L 45/741 |
| | | | 370/352 |
| 2015/0207779 A1* | 7/2015 | Hsu | H04L 63/10 |
| | | | 726/4 |
| 2016/0036943 A1* | 2/2016 | Kish | H04L 61/4511 |
| | | | 709/203 |
| 2016/0066354 A1 | 3/2016 | Oba et al. | |
| 2017/0330062 A1* | 11/2017 | Inoue | H04W 4/80 |
| 2018/0255066 A1* | 9/2018 | Gabriel | H04L 63/102 |

FOREIGN PATENT DOCUMENTS

| | | |
|---|---|---|
| JP | 2011-096155 A | 5/2011 |
| JP | 2016-051921 A | 4/2016 |
| JP | 2016-184793 A | 10/2016 |

OTHER PUBLICATIONS

Stading et al, Secure Communication in a Distributed System Using Identity Based Encryption, IEEE, May 15, 2003, pp. 1-7. (Year: 2003).*

Boukerche et al, The Design of A Secure Key Management System for Mobile Ad Hoc Networks, IEEE, Oct. 17, 2008, pp. 320-327 (Year: 2008).*

Wei et al, Application Research on IPv4/IPv6 Dual Stack Technology, IEEE, May 17, 2009, pp. 826-828. (Year: 2009).*

International Search Report and Written Opinion dated Sep. 10, 2019 in International Application No. PCT/JP2019/026020; with partial English translation.

* cited by examiner

FIG. 3

| COMMUNICATION APPARATUS ID | IP ADDRESS | IP ADDRESS VERSION |
|---|---|---|
| node1 | A | IPv6 |
|  |  |  |
|  |  |  |

FIG. 4

| COMMUNICATION APPARATUS ID | IP ADDRESS | IP ADDRESS VERSION |
|---|---|---|
| node1 | A | IPv6 |
| node2 | B | IPv4 |
|  |  |  |

FIG. 6

| COMMUNICATION APPARATUS ID | IP ADDRESS | IP ADDRESS VERSION |
|---|---|---|
| node1 | A | IPv6 |
| node1 | C | IPv4 |
|  |  |  |

FIG. 7

| COMMUNICATION APPARATUS ID | IP ADDRESS | IP ADDRESS VERSION |
|---|---|---|
| node1 | A | IPv6 |
| node1 | C | IPv4 |
| node2 | B | IPv4 |

FIG. 9

| COMMUNICATION APPARATUS ID | IP ADDRESS | IP ADDRESS VERSION |
|---|---|---|
| node1 | C | IPv4 |
| node2 | B | IPv4 |
| | | |

COMMUNICATION SYSTEM, CRYPTOGRAPHIC KEY DISTRIBUTION METHOD, MANAGEMENT COMMUNICATION APPARATUS, AND COMMUNICATION APPARATUS

CROSS-REFERENCE OF RELATED APPLICATIONS

This application is the U.S. National Phase under 35 U.S.C. § 371 of International Patent Application No. PCT/JP2019/026020, filed on Jul. 1, 2019, which in turn claims the benefit of Japanese Application No. 2018-143236, filed on Jul. 31, 2018, the entire disclosures of which Applications are incorporated by reference herein.

TECHNICAL FIELD

The present invention relates to a communication system, a cryptographic key distribution method, a management communication apparatus, and a communication apparatus.

BACKGROUND ART

Conventionally, a technique for performing device authentication processing before communicating between devices has been known. Patent Literature (PTL) 1 discloses a device authentication system including a gateway apparatus that manages devices in the home or company, a device ID management server that manages various devices in cooperation with the gateway apparatus, and a model management server that manages the own device ID, model information and the like at each manufacturer.

CITATION LIST

Patent Literature

PTL 1: Japanese Unexamined Patent Application Publication No. 2011-96155

SUMMARY OF THE INVENTION

Technical Problem

By the way, when Internet Protocol (IP) addresses in different versions from each other are mixed in a communication system, communication may not be possible due to inconsistency of IP addresses.

The present invention provides a communication system, a cryptographic key distribution method, a management communication apparatus, and a communication apparatus that can suppress the inability to communicate due to inconsistency of IP addresses.

Solutions to Problem

The communication system according to one aspect of the present invention is a communication system including a management communication apparatus; a first communication apparatus; and a second communication apparatus, wherein the first communication apparatus is capable of communicating using a plurality of Internet Protocol (IP) addresses in different versions from each other, the first communication apparatus includes a first communication unit configured to notify the management communication apparatus of a first IP address among the plurality of IP addresses in a first authentication process for entering the communication system, and to notify the management communication apparatus of a second IP address among the plurality of IP addresses after the first authentication process, the first authentication process being performed between the first communication apparatus and the management communication apparatus, the management communication apparatus includes: a communication unit configured to obtain a request for a cryptographic key for performing cryptographic communication between the first communication apparatus and the second communication apparatus; and an information processing unit configured to perform, in response to the request for the cryptographic key obtained, a first cryptographic key distribution process for distributing the cryptographic key to the first communication apparatus and a second cryptographic key distribution process for distributing the cryptographic key to the second communication apparatus.

The cryptographic key distribution method according to one aspect of the present invention is a cryptographic key distribution method performed by a communication system including a management communication apparatus, a first communication apparatus, and a second communication apparatus, wherein the first communication apparatus is capable of communicating using a plurality of IP addresses in different versions from each other, the first communication apparatus notifies the management communication apparatus of a first IP address among the plurality of IP addresses in a first authentication process for entering the communication system, which is performed between the first communication apparatus and the management communication apparatus, and notifies the management communication apparatus of a second IP address among the plurality of IP addresses after the first authentication process, the management communication apparatus obtains a request for a cryptographic key for performing cryptographic communication between the first communication apparatus and the second communication apparatus; and the management communication apparatus perform, in response to the request for the cryptographic key obtained, a first cryptographic key distribution process for distributing the cryptographic key to the first communication apparatus and a second cryptographic key distribution process for distributing the cryptographic key to the second communication apparatus.

The management communication apparatus according to one aspect of the present invention is a management communication apparatus used in a communication system including a first communication apparatus and a second communication apparatus, wherein the first communication apparatus is capable of communicating using a plurality of IP addresses in different versions from each other, and the management communication apparatus includes: a communication unit configured to (a) receive a notice of a first IP address from the first communication apparatus among the plurality of IP addresses in a first authentication process for entering the communication system, which is performed between the management communication apparatus and the first communication apparatus, (b) receive a notice of a second IP address from the first communication apparatus among the plurality of IP addresses after the first authentication process, and (c) obtain a request for a cryptographic key for performing cryptographic communication between the first communication apparatus and the second communication apparatus; and an information processing unit configured to perform, in response to the request for the cryptographic key obtained, a first cryptographic key distribution process for distributing the cryptographic key to the first communication apparatus and a second cryptographic key distribution process for distributing the cryptographic key to the second communication apparatus.

The communication apparatus according to one aspect of the present invention is a communication apparatus included in a communication system, wherein the communication apparatus is capable of communicating using a plurality of Internet Protocol (IP) addresses in different versions from each other, the first communication apparatus includes a communication unit configured to notify a management communication apparatus of a first IP address among the plurality of IP addresses in a first authentication process for entering the communication system, which is performed between the communication apparatus and the management communication apparatus included in the communication apparatus, and to notify the management communication apparatus of a second IP address among the plurality of IP addresses after the first authentication process, the communication unit sends a request for a cryptographic key for performing cryptographic communication between the communication apparatus and other communication apparatuses included in the communication system to the management communication apparatus, and the management communication apparatus performs, in response to the request for the cryptographic key obtained, a first cryptographic key distribution process for distributing the cryptographic key to the communication apparatus and a second cryptographic key distribution process for distributing the cryptographic key to the other communication apparatuses.

Advantageous Effect of Invention

According to the present invention, a communication system, a cryptographic key distribution method, a management communication apparatus, and a communication apparatus that can suppress the inability to communicate due to inconsistency of IP addresses are realized.

BRIEF DESCRIPTION OF DRAWINGS

FIG. 3 is a diagram showing an example of address management information.

FIG. 4 is a diagram showing an example of the address management information after the update.

FIG. 6 is a diagram showing an example of the address management information after the update in Operation example 1.

FIG. 7 is a diagram showing an example of the address management information after the second update in Operation example 1.

FIG. 9 is a diagram showing an example of the address management information after the update in Operation example 2.

DESCRIPTION OF EXEMPLARY EMBODIMENTS

Figure 1:
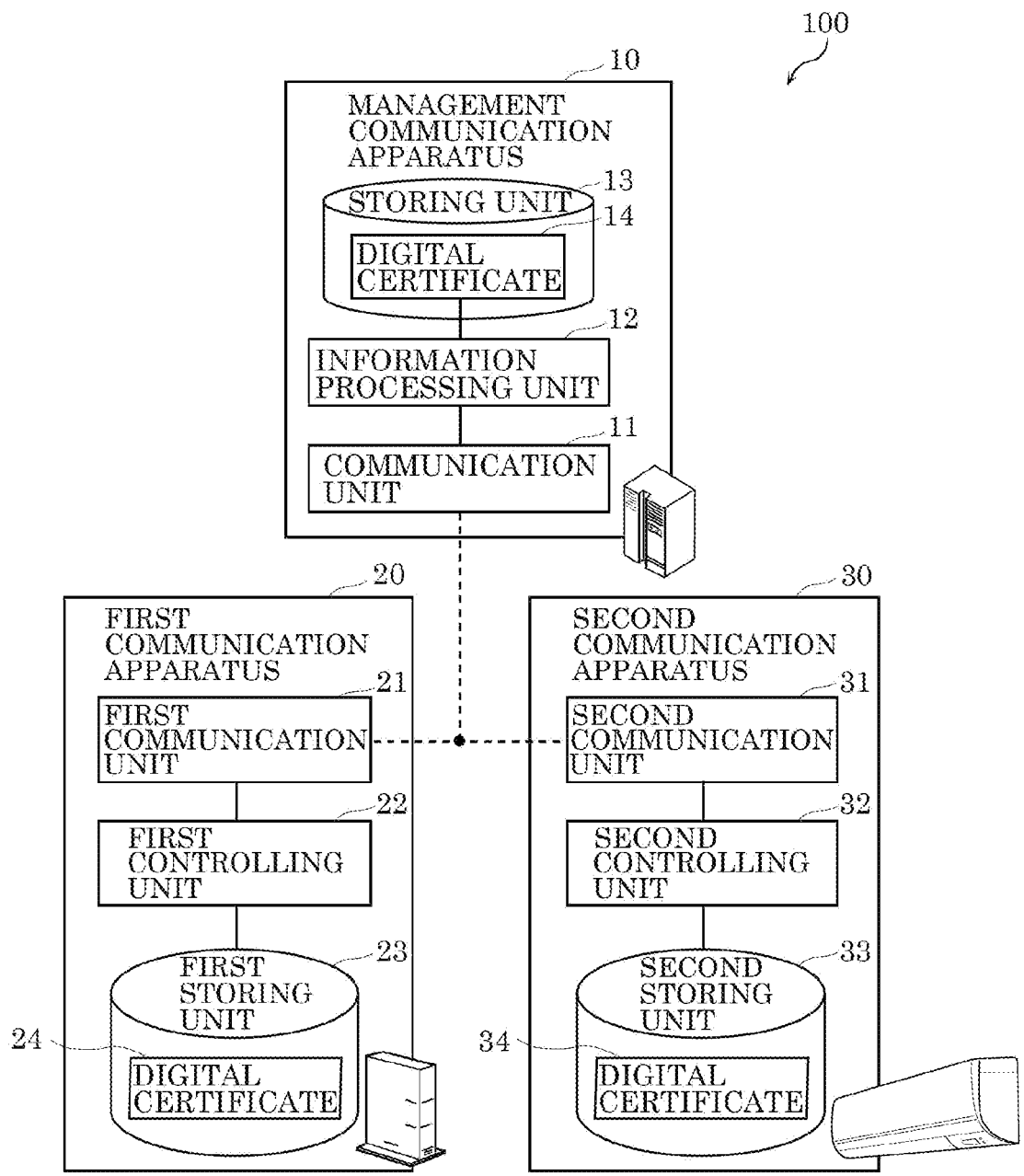
FIG. 1 is a block diagram showing a functional configuration of a communication system according to an embodiment.

Hereinafter, the embodiment will be specifically described with reference to the drawings. It should be noted that each embodiment described below shows a comprehensive or specific example. The numerical values, shapes, materials, components, arrangement positions and connection forms of the components, steps, the order of steps, and the like shown in the following embodiments are examples, and are not intended to limit the present invention. In addition, among the components in the following embodiment, the components not described in the independent claims will be described as arbitrary components.

It should be noted that each figure is a schematic diagram and is not necessarily exactly illustrated. In addition, in each figure, substantially the same configuration may be designated by the same reference numerals, and duplicate description may be omitted or simplified.

Embodiment

[Configuration]

First, the configuration of the communication system according to an embodiment will be described. FIG. 1 is a block diagram showing a functional configuration of a communication system according to the embodiment.

Communication system 100 according to the embodiment is a system for communicating between communication apparatuses using a local communication network. Communication system 100 is, for example, a HEMS (Home Energy Management System), and in communication system 100, communication apparatuses (in other words, devices) installed in a house communicate with each other. This communication conforms to, for example, ECHONET Lite (registered trademark), but may conform to other communication standards.

In addition, in communication system 100, a mechanism for suppressing the entry of an unauthorized device into communication system 100 by an authentication process using a digital certificate is provided, and cryptographic communication is performed between communication apparatuses. As described above, the security of communication is enhanced in communication system 100.

Specifically, communication system 100 includes management communication apparatus 10, first communication apparatus 20, and second communication apparatus 30. The number of communication apparatuses included in communication system 100 is an example, and communication system 100 may include four or more communication apparatuses. In addition, communication system 100 does not include a DNS (Domain Name System) server. Hereinafter, the functional configuration of each apparatus configuring communication system 100 will be described in detail.

[Management Communication Apparatus]

Management communication apparatus 10 is a management apparatus (in other words, a group manager) in communication system 100, and performs authentication processing when another communication apparatus enters communication system 100, cryptographic key distribution processing, and the like. Specifically, management communication apparatus 10 is, for example, a HEMS controller, but may be another apparatus. Management communication apparatus 10 includes communication unit 11, information processing unit 12, and storing unit 13.

Communication unit 11 is a communication circuit (in other words, a communication module) for management communication apparatus 10 to communicate with first communication apparatus 20 or second communication apparatus 30. The communication performed by communication unit 11 is wireless communication, but may be wired communication. The communication performed by communication unit 11 conforms to, for example, ECHONET Lite (registered trademark), but the communication standard of the communication performed by communication unit 11 is not particularly limited.

Information processing unit 12 performs information processing such as authentication processing and cryptographic key distribution processing. Information processing unit 12 is realized by, for example, a microcomputer, but may be realized by a processor or a dedicated circuit.

Storing unit 13 is a storage apparatus that stores a control program executed by information processing unit 12, digital certificate 14 used for the above-mentioned authentication process, and the like. Storing unit 13 is realized by, for example, a semiconductor memory or the like.

[First Communication Apparatus]

First communication apparatus 20 is a device that enters communication system 100 and communicates with other communication apparatuses. First communication apparatus 20 is, for example, a HEMS controller of a lower order than management communication apparatus 10 (in other words, entering communication system 100 after management communication apparatus 10). First communication apparatus 20 may be a device such as an air conditioning device, a smart meter, an electric vehicle, a lighting device, a storage battery system, a fuel cell system, a heat pump type water heater, or a photovoltaic power generation system. First communication apparatus 20 includes first communication unit 21, first controlling unit 22, and first storing unit 23.

First communication unit 21 is a communication circuit (in other words, a communication module) for first communication apparatus 20 to communicate with management communication apparatus 10 or second communication apparatus 30. The communication performed by first communication unit 21 is wireless communication, but may be wired communication. The communication performed by first communication unit 21 conforms to, for example, ECHONET Lite (registered trademark), but the communication standard of the communication performed by first communication unit 21 is not particularly limited.

First controlling unit 22 performs information processing such as authentication processing and cryptographic key distribution processing. First controlling unit 22 is realized by, for example, a microcomputer, but may be realized by a processor or a dedicated circuit.

First storing unit 23 is a storage apparatus that stores a control program executed by first controlling unit 22, digital certificate 24 used for the above-mentioned authentication process, and the like. First storing unit 23 is realized by, for example, a semiconductor memory or the like.

[Second Communication Apparatus]

Second communication apparatus 30 is a device that enters communication system 100 and communicates with other communication apparatuses. Second communication apparatus 30 is, for example, an air conditioning device, but may be a device such as a smart meter, an electric vehicle, a lighting device, a storage battery system, a fuel cell system, a heat pump type water heater, or a photovoltaic power generation system. Second communication apparatus 30 may be a HEMS controller lower than management communication apparatus 10 (in other words, entering communication system 100 after management communication apparatus 10). Second communication apparatus 30 includes second communication unit 31, second controlling unit 32, and second storing unit 33.

Second communication unit 31 is a communication circuit (in other words, a communication module) for second communication apparatus 30 to communicate with management communication apparatus 10 or first communication apparatus 20. The communication performed by second communication unit 31 is wireless communication, but may be wired communication. The communication performed by second communication unit 31 conforms to, for example, ECHONET Lite (registered trademark), but the communication standard of the communication performed by second communication unit 31 is not particularly limited.

Second controlling unit 32 performs information processing such as authentication processing and cryptographic key distribution processing. Second controlling unit 32 is realized by, for example, a microcomputer, but may be realized by a processor or a dedicated circuit.

Second storing unit 33 is a storage apparatus that stores a control program executed by second controlling unit 32, digital certificate 34 used for the above-mentioned authentication process, and the like. Second storing unit 33 is realized by, for example, a semiconductor memory or the like.

[Basic Operation]

Figure 2:
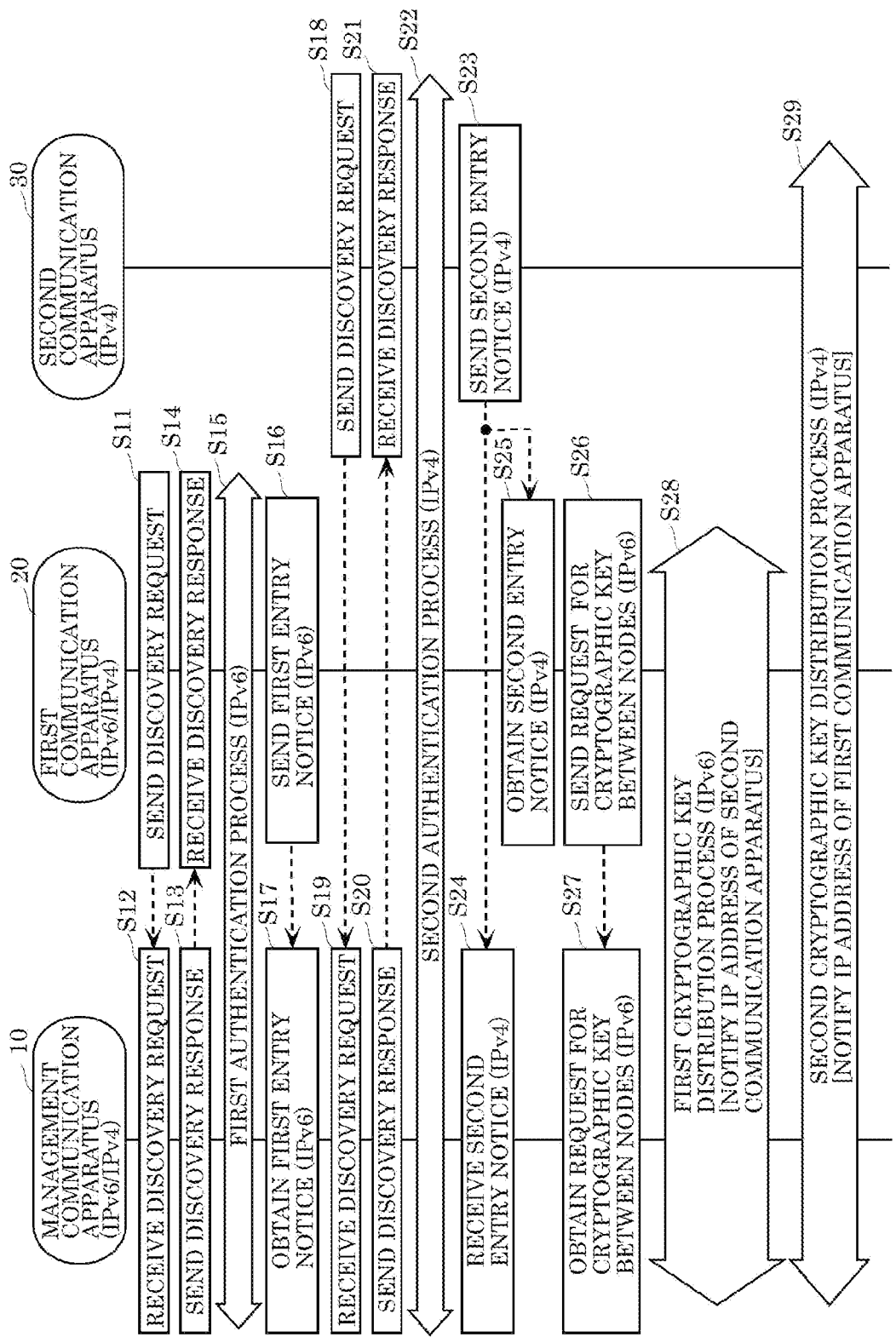
FIG. 2 is a sequence diagram of the basic operation of the communication system according to the embodiment.

Next, the basic operation until first communication apparatus 20 and second communication apparatus 30 enter communication system 100 and first communication apparatus 20 and second communication apparatus 30 obtain the inter-node cryptographic key for communication will be described. FIG. 2 is a sequence diagram of the basic operation of communication system 100. It should be noted that the basic operation will be described assuming that there is no inconsistency in the Internet Protocol (IP) address described later. Therefore, the description of the basic operation does not mention the version information of the IP address in FIG. 2.

First, the operation of first communication apparatus 20 entering communication system 100 will be described. First communication unit 21 of first communication apparatus 20 sends a discovery request (S11). When the discovery request is received by communication unit 11 of management communication apparatus 10 (S12), information processing unit 12 causes communication unit 11 to send the discovery response (S13). The discovery request may be sent by communication unit 11 of management communication apparatus 10 and received by first communication unit 21 of first communication apparatus 20.

When the sent discovery response is received by communication unit 11 of first communication unit 21 (S14), the first authentication process is started (S15). The first authentication process is an authentication process performed between first communication apparatus 20 and management communication apparatus 10 for first communication apparatus 20 to enter communication system 100. The first authentication process is a mutual authentication process performed according to an authentication protocol such as PANA (Protocol for Carrying Authentication for Network Access). In the first authentication process, information processing unit 12 of management communication apparatus 10 verifies digital certificate 24 of first communication apparatus 20, and first controlling unit 22 of first communication apparatus 20 verifies digital certificate 14 of management communication apparatus 10.

When it is verified that the digital certificates of each other are legitimate, the first cryptographic key used for communication between first communication apparatus 20 and management communication apparatus 10, and the third cryptographic key used for communication between first communication apparatus 20 and all the communication apparatuses included in communication system 100 are distributed from management communication apparatus 10 to first communication apparatus 20.

Then, first communication unit 21 of first communication apparatus 20 gives the first entry notice based on the control of first controlling unit 22. For example, when the communication performed by first communication unit 21 complies with ECHONET Lite (registered trademark), the first entry notice is called an instance list notice. At this point, the first entry notice is given to all the communication apparatuses included in communication system 100 other than first communication apparatus 20. The first entry notice is encrypted by the third cryptographic key. In the example of FIG. 2, first communication unit 21 sends the first entry notice (S16), and communication unit 11 of management communication apparatus 10 obtains this (S17). With this, the operation for first communication apparatus 20 to enter communication system 100 is completed.

Next, the operation of second communication apparatus 30 entering communication system 100 will be described. Second communication unit 31 of second communication apparatus 30 sends a discovery request (S18). When the discovery request is received by communication unit 11 of management communication apparatus 10 (S19), information processing unit 12 causes communication unit 11 to send the discovery response (S20). It should be noted that the discovery request may be sent by communication unit 11 of management communication apparatus 10 and received by second communication unit 31 of second communication apparatus 30.

When the sent discovery response is received by communication unit 11 of second communication unit 31 (S21), the second authentication process is started (S22). The second authentication process is an authentication process performed between second communication apparatus 30 and management communication apparatus 10 for second communication apparatus 30 to enter communication system 100. The second authentication process is a mutual authentication process performed according to an authentication protocol such as PANA and the like. In the second authentication process, information processing unit 12 of management communication apparatus 10 verifies digital certificate 34 of second communication apparatus 30, and second controlling unit 32 of second communication apparatus 30 verifies digital certificate 14 of management communication apparatus 10.

When it is verified that the digital certificates of each other are legitimate, the second cryptographic key used for communication between second communication apparatus 30 and management communication apparatus 10, and the third cryptographic key used for communication between second communication apparatus 30 and all the communication apparatuses included in communication system 100 are distributed from management communication apparatus 10 to second communication apparatus 30.

Then, second communication unit 31 of second communication apparatus 30 gives the second entry notice based on the control of second controlling unit 32. For example, when the communication performed by second communication unit 31 complies with ECHONET Lite (registered trademark), the second entry notice is called an instance list notice. The second entry notice is given to all the communication apparatuses included in communication system 100 at this time other than second communication apparatus 30. The second entry notice is encrypted by the third cryptographic key described above. In the example of FIG. 2, second communication unit 31 sends the second entry notice (S23), communication unit 11 of management communication apparatus 10 obtains this (S24), and first communication unit 21 of first communication apparatus 20 also obtains this (S25). With this, the operation for second communication apparatus 30 to enter communication system 100 is completed. It should be noted that when second communication apparatus 30 enters communication system 100 before first communication apparatus 20, the order of steps S11 to S17 and steps S18 to S25 is reversed.

Next, the inter-node cryptographic key distribution operation for performing cryptographic communication between first communication apparatus 20 and second communication apparatus 30 will be described. First communication unit 21 of first communication apparatus 20 sends a request for an internode cryptographic key (S26). Communication unit 11 of management communication apparatus 10 obtains the request for the internode cryptographic key from first communication apparatus 20 (S27), and information processing unit 12 performs the first cryptographic key distribution process for distributing the inter-node cryptographic key to first communication apparatus 20 in response to the obtained inter-node cryptographic key request (S28). The first cryptographic key distribution process is performed based on the cryptographic communication using the first cryptographic key described above.

In addition, information processing unit 12 performs a second cryptographic key distribution process for distributing the inter-node cryptographic key to second communication apparatus 30 (S29). The second cryptographic key distribution process is performed based on the cryptographic communication using the second cryptographic key described above. When the inter-node cryptographic key is distributed to each of first communication apparatus 20 and second communication apparatus 30 in this way, cryptographic communication between first communication apparatus 20 and second communication apparatus 30 becomes possible.

It should be noted that in the basic operation, the discovery request may be sent from management communication apparatus 10 instead of first communication apparatus 20 or second communication apparatus 30. The request for the internode cryptographic key may be sent from second communication apparatus 30 instead of first communication apparatus 20.

[Issue in Basic Operation]

There is no problem in the above-mentioned basic operation when management communication apparatus 10, first communication apparatus 20, and second communication apparatus 30 can all communicate with the same version (specifically, IPv6) of IP addresses. However, it is conceivable that management communication apparatus 10 and first communication apparatus 20 are compatible with IPv4 and IPv6, and second communication apparatus 30 is compatible only with IPv4. That is, it is conceivable that each of management communication apparatus 10 and first communication apparatus 20 is capable of communicating using a plurality of IP addresses in different versions from each other, and second communication apparatus 30 is capable of communicating using only one version of the IP address. In such a case, there is a possibility that first communication apparatus 20 and second communication apparatus 30 cannot perform cryptographic communication due to the inconsistency of the IP addresses. Hereinafter, such an issue will be further described with reference to FIG. 2.

Notice of the IP address of first communication apparatus 20 from first communication apparatus 20 to management communication apparatus 10 is given in the first authentication process of step S15. At this time, storing unit 13 of management communication apparatus 10 stores the ID, the IP address, and the address management information associated with the version information of the IP address of first communication apparatus 20. FIG. 3 is a diagram showing an example of address management information. In the example of FIG. 3, the ID of first communication apparatus 20 is "node1" and the IP address is "A". This IP address is an IPv6 compatible IP address.

As a result, in the first authentication process, the first entry notice, and the first cryptographic key distribution process, communication between management communication apparatus 10 and first communication apparatus 20 is performed using an IPv6 compatible IP address.

Similarly, the notice of the IP address of second communication apparatus 30 from second communication apparatus 30 to management communication apparatus 10 is given in the second authentication process of step S22. At this time, information processing unit 12 of management communication apparatus 10 updates the address management information by adding the ID, the IP address, and the version information of the IP address of second communication apparatus 30 to the address management information. FIG. 4 is a diagram showing an example of the address management information after the update. In the example of FIG. 4, it is assumed that the ID of second communication apparatus 30 is "node2" and the IP address is "B". This IP address is an IPv4 compatible IP address.

As a result, in the second authentication process, the second entry notice, and the second cryptographic key distribution process, communication between management communication apparatus 10 and second communication apparatus 30 is performed using the IPv4 compatible IP address.

Information processing unit 12 of management communication apparatus 10 notifies first communication apparatus 20 of the IP address of second communication apparatus 30 in the first cryptographic key distribution process. The IP address notified at this time is determined based on the address management information of FIG. 4. That is, first communication apparatus 20 is notified of the IPv4 compatible IP address "B" as the IP address of second communication apparatus 30.

Similarly, information processing unit 12 notifies second communication apparatus 30 of the IP address of first communication apparatus 20 in the second cryptographic key distribution process. The IP address notified at this time is determined based on the address management information of FIG. 4, and second communication apparatus 30 is notified of the IPv6 compatible IP address "A" as the IP address of first communication apparatus 20. Since the IPv6 compatible IP address of first communication apparatus 20 is notified to second communication apparatus 30 which is compatible only for IPv4 and is not compatible for IPv6, the problem is that cryptographic communication between first communication apparatus 20 and second communication apparatus 30 is not possible.

Operation Example 1

Figure 5:
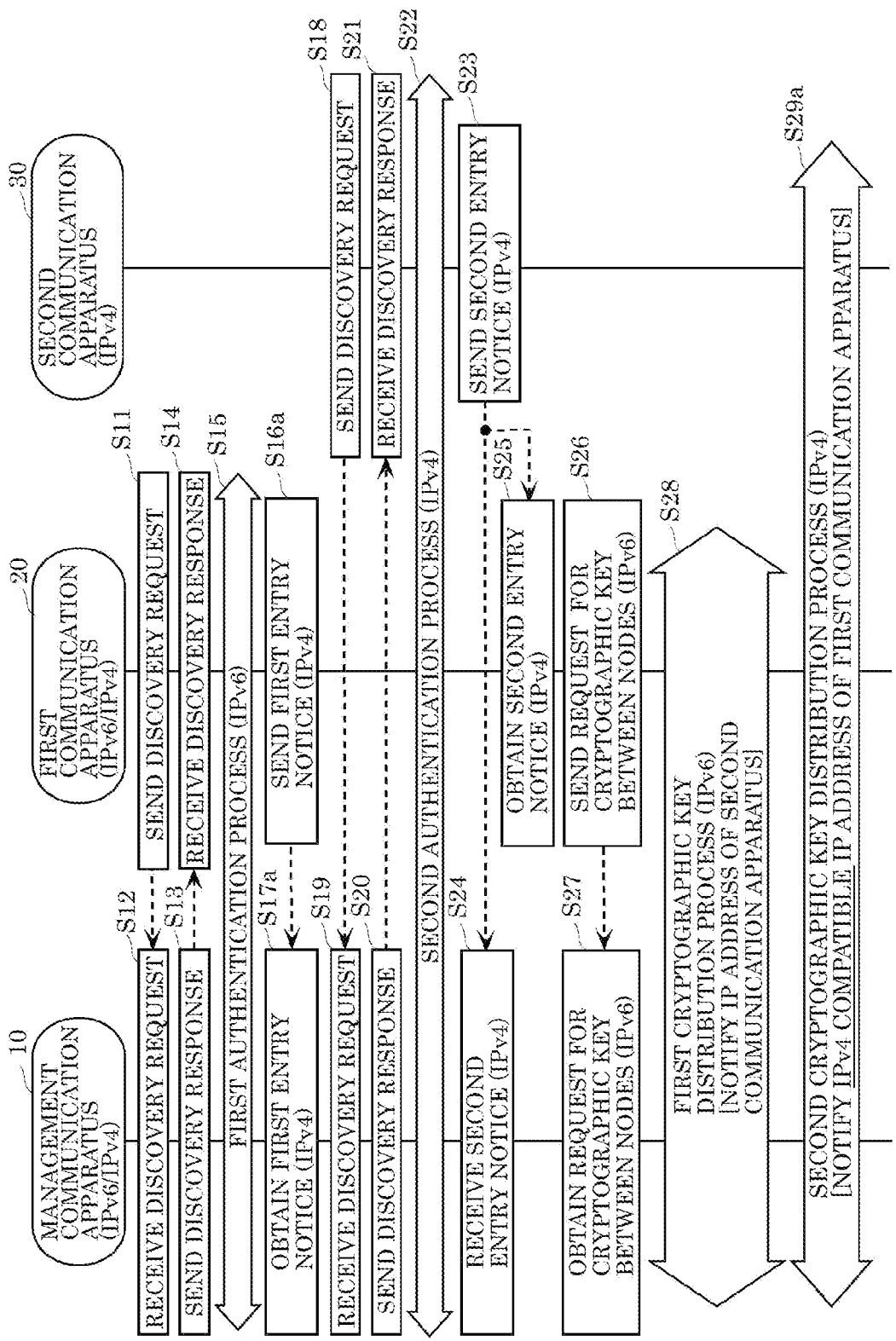
FIG. 5 is a sequence diagram of Operation example 1 of the communication system according to the embodiment.

Operation example 1 for solving the problem as described above will be described. FIG. 5 is a sequence diagram of Operation example 1. It should be noted that in the following, explanations will be given focusing on the differences from the basic operation, and explanations of the items already mentioned will be omitted as appropriate.

As shown in FIG. 5, in Operation example 1, after giving the first entry notice using the IPv6 compatible IP address, first communication unit 21 of first communication apparatus 20 gives the first notice of entry again using the IPv4 compatible IP address (S16a). The first entry notice in step S16a is given after the first authentication process and before the second cryptographic key distribution process.

When the first entry notice in step S16a is obtained by communication unit 11 of management communication apparatus 10 (S17a), information processing unit 12 updates the address management information (shown in FIG. 3). FIG. 6 is a diagram showing an example of the address management information after the update in Operation example 1. Specifically, information processing unit 12 updates the address management information by adding the ID "node 1", the IP address "C", and the version information "IPv4" of the IP address of first communication apparatus 20 to the address management information.

After that, when the second authentication process is performed, information processing unit 12 further updates the address management information by adding the ID, the IP address, and the version information of the IP address of second communication apparatus 30 to the address management information. FIG. 7 is a diagram showing an example of the address management information after the second update in Operation example 1.

After that, when the request for the inter-node cryptographic key is obtained by communication unit 11 of management communication apparatus 10 (S27), information processing unit 12 can confirm, by referring to the address information in FIG. 7, that second communication apparatus 30 of the communication partner of first communication apparatus 20 is compatible only for IPv4, and the IPv4 compatible IP address of first communication apparatus 20 is stored. That is, information processing unit 12 can select the IP address of first communication apparatus 20 identical in version (that is, IPv4) to the IP address of second communication apparatus 30 notified in the second authentication process.

Thus, information processing unit 12 notifies second communication apparatus 30 of the IPv4 compatible IP address of first communication apparatus 20 in the second cryptographic key distribution process (S29a). Communication unit 11 is used to notify the IP address. As a result, cryptographic communication between first communication apparatus 20 and second communication apparatus 30 becomes possible.

In this way, first communication apparatus 20 which is capable of communicating using a plurality of IP addresses in different versions from each other gives the first entry notice a plurality of times for each IP address in Operation example 1. By managing the plurality of IP addresses of first communication apparatus 20 by management communication apparatus 10, the occurrence of IP address inconsistency is suppressed.

Operation Example 2

Figure 8:
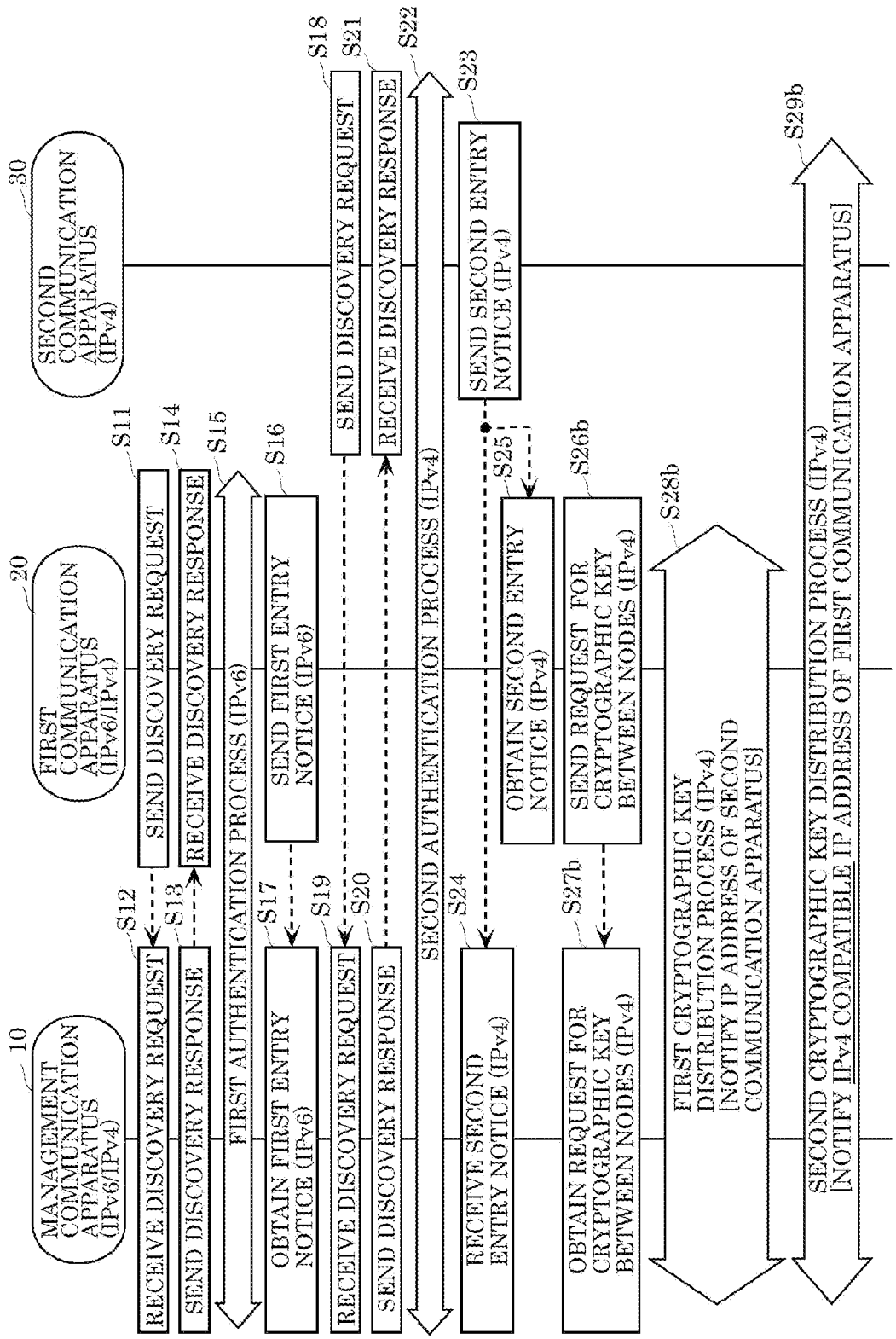
FIG. 8 is a sequence diagram of Operation example 2 of the communication system according to the embodiment.

Operation example 2 for solving the above-mentioned problem will be described. FIG. 8 is a sequence diagram of Operation example 2. It should be noted that in the following, explanations will be given focusing on the differences from the basic operation, and explanations of the items already mentioned will be omitted as appropriate.

When the second entry notice is obtained by first communication unit 21 of first communication apparatus 20 (S25), first controlling unit 22 can recognize that second communication apparatus 30 is communicating with an IPv4 compatible IP address. That is, first controlling unit 22 can determine whether the version of the IP address of second communication apparatus 30 notified by the second entry notice is IPv4 or IPv6.

When first controlling unit 22 determines that the version of the IP address of second communication apparatus 30 is IPv4, first communication unit 21 a request for an internode cryptographic key using the IPv4 compatible IP address based on the control of first controlling unit 22 (S26b). That is, first communication unit 21 notifies management communication apparatus 10 of the IPv4 compatible IP address by the request for the internode cryptographic key. The request for the inter-node cryptographic key is sent after the first authentication process and before the second cryptographic key distribution process.

Communication unit 11 of management communication apparatus 10 obtains the request for the inter-node cryptographic key from first communication apparatus 20 (S27b), and information processing unit 12 updates the address management information (shown in FIG. 4). FIG. 9 is a diagram showing an example of the address management information after the update in Operation example 2. Specifically, information processing unit 12 updates the address management information by overwriting the portion of the address management information corresponding to first communication apparatus 20.

After that, information processing unit 12 performs the first cryptographic key distribution process using the IPv4 compatible IP address by referring to the address management information in FIG. 9 (S28b). Information processing unit 12 notifies first communication apparatus 20 of the IPv4 compatible IP address of second communication apparatus 30 in the second cryptographic key distribution process. Communication unit 11 is used to notify the IP address.

In addition, information processing unit 12 performs the second cryptographic key distribution process for distributing the inter-node cryptographic key to second communication apparatus 30 by referring to the address management information of FIG. 9 (S29b). Information processing unit 12 notifies second communication apparatus 30 of the IPv4 compatible IP address of first communication apparatus 20 in the second cryptographic key distribution process. Communication unit 11 is used to notify the IP address. As a result, cryptographic communication between first communication apparatus 20 and second communication apparatus 30 becomes possible.

In this way, in Operation example 2, when it is determined that the version of the IP address of second communication apparatus 30 notified by the second entry notice is different from that of IPv6, first communication unit 21 of first communication apparatus 20 selects an IP address identical in version (that is, IPv4) to the IP address of second communication apparatus 30 to notify management communication apparatus 10. As a result, the occurrence of IP address inconsistency is suppressed.

[Effects, Etc.]

As described above, communication system 100 is a communication system including management communication apparatus 10, first communication apparatus 20, and second communication apparatus 30. First communication apparatus 20 is capable of communicating using a plurality of IP addresses in different versions from each other, and includes first communication unit 21 that notifies management communication apparatus 10 of a first IP address among the plurality of IP addresses in a first authentication process for entering communication system 100, which is performed between first communication apparatus 20 and management communication apparatus 10, and to notify management communication apparatus 10 of a second IP address among the plurality of IP addresses after the first authentication process. In the above embodiment, the first IP address is an IPv6 compatible IP address, and the second IP address is an IPv4 compatible IP address. Management communication apparatus 10 includes communication unit 11 configured to obtain a request for an inter-node cryptographic key for performing cryptographic communication between first communication apparatus 20 and second communication apparatus 30; and information processing unit 12 configured to perform, in response to the request for the cryptographic key obtained, a first cryptographic key distribution process for distributing the inter-node cryptographic key to first communication apparatus 20 and a second cryptographic key distribution process for distributing the inter-node cryptographic key to second communication apparatus 30.

In such communication system 100, two types of IP addresses in different versions from each other are notified from first communication apparatus 20 to management communication apparatus 10. Thus, there is an increased possibility that management communication apparatus 10 notifies second communication apparatus 30 of the IP address of first communication apparatus 20 compatible in version to second communication apparatus 30. Therefore, the impossibility of cryptographic communication between first communication apparatus 20 and second communication apparatus 30 due to the inconsistency of IP addresses can be suppressed.

In addition, for example, first communication unit 21 notifies management communication apparatus 10 of the second IP address after the first authentication process and before the second cryptographic key distribution process.

In such communication system 100, two types of IP addresses in different versions from each other are notified from first communication apparatus 20 to management communication apparatus 10 before the second cryptographic key distribution process. Thus, there is an increased possibility that management communication apparatus 10 notifies second communication apparatus 30 of the IP address of first communication apparatus 20 compatible in version to second communication apparatus 30 in the second cryptographic key distribution process. Therefore, the impossibility of cryptographic communication between first communication apparatus 20 and second communication apparatus 30 due to the inconsistency of IP addresses can be suppressed.

In addition, in Operation example 1, after the first authentication process, first communication unit 21 gives a first entry notice to a communication apparatus included in communication system 100 other than first communication apparatus 20, and notifies management communication apparatus 10 of the second IP address by the first entry notice.

Such communication system 100 can notify management communication apparatus 10 of the second IP address of first communication apparatus 20 by the first entry notice.

In addition, in Operation example 1, the second authentication process for second communication apparatus 30 to enter communication system 100 is performed between second communication apparatus 30 and management communication apparatus 10. In the second cryptographic key distribution process, information processing unit 12 selects an IP address identical in version to the IP address of second communication apparatus 30 notified in the second authentication process from the first IP address and the second IP address. Communication unit 11 notifies second communication apparatus 30 of the selected IP address in the second cryptographic key distribution process.

Such communication system 100 can suppress the impossibility of cryptographic communication between first communication apparatus 20 and second communication apparatus 30 due to the inconsistency of IP addresses.

In addition, in Operation example 2, first communication unit 21 notifies the management communication apparatus of the second IP address by the request for the inter-node cryptographic key after the first authentication process.

Such communication system 100 can notify management communication apparatus 10 of the second IP address of first communication apparatus 20 by the request for the internode cryptographic key.

In addition, in Operation example 2, second communication apparatus 30 includes second communication unit 31 for giving second entry notice to a communication apparatus included in communication system 100 other than second communication apparatus 30 after the second authentication process for entering communication system 100, which is performed between second communication apparatus 30 and management communication apparatus 10. When it is determined that a version of the IP address of second communication apparatus 30 notified by the second entry notice is different from a version of the first IP address, first communication unit 21 notifies management communication apparatus 10 of the second IP address by the request for the inter-node cryptographic key.

Such communication system 100 can suppress the impossibility of cryptographic communication between first communication apparatus 20 and second communication apparatus 30 due to the inconsistency of IP addresses.

In addition, in Operation example 2, management communication apparatus 10 further includes storing unit 13 in which the first IP address notified in the first authentication process is stored. When the second IP address is notified, information processing unit 12 updates the first IP address stored in storing unit 13 to the second IP address.

Such a communication system 100 can suppress the impossibility of cryptographic communication between first communication apparatus 20 and second communication apparatus 30 due to the inconsistency of IP addresses.

In addition, the present invention may be realized as a cryptographic key distribution method performed by communication system 100 including management communication apparatus 10, first communication apparatus 20, and second communication apparatus 30. First communication apparatus 20 is capable of communicating using a plurality of IP addresses in different versions from each other, notifies management communication apparatus 10 of a first IP address among the plurality of IP addresses in a first authentication process for entering communication system 100, which is performed between first communication apparatus 20 and management communication apparatus 10, and to notify management communication apparatus 10 of a second IP address among the plurality of IP addresses after the first authentication process. Management communication apparatus 10 obtains a request for an inter node cryptographic key for performing cryptographic communication between first communication apparatus 20 and second communication apparatus 30, and performs, in response to the request for the cryptographic key obtained, a first cryptographic key distribution process for distributing the inter-node cryptographic key to first communication apparatus 20 and a second cryptographic key distribution process for distributing the inter-node cryptographic key to second communication apparatus 30.

In such a cryptographic key distribution method, two types of IP addresses in different versions from each other are notified from first communication apparatus 20 to management communication apparatus 10. Thus, there is an increased possibility that management communication apparatus 10 notifies second communication apparatus 30 of the IP address of first communication apparatus 20 compatible in version to second communication apparatus 30. Therefore, the impossibility of cryptographic communication between first communication apparatus 20 and second communication apparatus 30 due to the inconsistency of IP addresses can be suppressed.

In addition, management communication apparatus 10 is a management communication apparatus used in communication system 100 including first communication apparatus 20 and second communication apparatus 30. First communication apparatus 20 is capable of communicating using a plurality of IP addresses in different versions from each other. Management communication apparatus 10 includes: a communication unit configured to (a) receive a notice of a first IP address from first communication apparatus 20 among the plurality of IP addresses in a first authentication process for entering communication system 100, which is performed between management communication apparatus 10 and first communication apparatus 20, (b) receive a notice of a second IP address from first communication apparatus 20 among the plurality of IP addresses after the first authentication process, and (c) obtain a request for an inter-node cryptographic key for performing cryptographic communication between first communication apparatus 20 and second communication apparatus 30; and information processing unit 12 configured to perform, in response to the request for the inter-node cryptographic key obtained, a first cryptographic key distribution process for distributing the inter-node cryptographic key to first communication apparatus 20 and a second cryptographic key distribution process for distributing the inter-node cryptographic key to second communication apparatus 30.

Such management communication apparatus 10 obtains two types of IP addresses in different versions from each other from first communication apparatus 20. If management communication apparatus 10 notifies second communication apparatus 30 of the IP address of first communication apparatus 20 compatible in version to second communication apparatus 30, the impossibility of cryptographic communication between first communication apparatus 20 and second communication apparatus 30 due to the inconsistency of IP addresses can be suppressed.

In addition, for example, communication unit 11 receives notice of the second IP address after the first authentication process and before the second cryptographic key distribution process.

Such management communication apparatus 10 obtains two types of IP addresses in different versions from each other from first communication apparatus 20 before the second cryptographic key distribution process. In the second cryptographic key distribution process, if second communication apparatus 30 is notified of the IP address of first communication apparatus 20 compatible in version to second communication apparatus 30, the impossibility of cryptographic communication between first communication apparatus 20 and second communication apparatus 30 due to the inconsistency of IP addresses can be suppressed.

In addition, in Operation example 1, after the first authentication process, first communication apparatus 20 gives the first entry notice to the communication apparatus included in communication system 100 other than first communication apparatus 20, and communication unit 11 receives the notice of the second IP address by first entry notice.

Such management communication apparatus 10 can receive notice of the second IP address of first communication apparatus 20 by the first entry notice.

In addition, in Operation example 2, communication unit 11 receives notice of the second IP address by the request for the inter-node cryptographic key after the first authentication process.

Such management communication apparatus 10 can receive notice of the second IP address of first communication apparatus 20 by the request for the inter-node cryptographic key.

In addition, first communication apparatus 20 is a communication apparatus included in communication system 100. First communication apparatus 20 is capable of communicating using a plurality of IP addresses in different versions from each other, and includes first communication unit 21 configured to notify management communication apparatus 10 of a first IP address among the plurality of IP addresses in a first authentication process for entering communication system 100, which is performed between first communication apparatus 20 and management communication apparatus 10, and to notify management communication apparatus 10 of a second IP address among the plurality of IP addresses after the first authentication process. First communication unit 21 sends a request for an inter-node cryptographic key for performing cryptographic communication between first communication apparatus 20 and second communication apparatus 30 included in communication system 100 to management communication apparatus 10, and management communication apparatus 10 performs, in response to the request for the cryptographic key obtained, a first cryptographic key distribution process for distributing the inter-node cryptographic key to first communication apparatus 20 and a second cryptographic key distribution process for distributing the inter-node cryptographic key to second communication apparatus 30.

Such first communication apparatus 20 notifies management communication apparatus 10 of two types of IP addresses in different versions from each other. Thus, there is an increased possibility that management communication apparatus 10 notifies second communication apparatus 30 of the IP address of first communication apparatus 20 compatible in version to second communication apparatus 30. Therefore, the impossibility of cryptographic communication between first communication apparatus 20 and second communication apparatus 30 due to the inconsistency of IP addresses can be suppressed.

In addition, first communication unit 21 notifies management communication apparatus 10 of the second IP address after the first authentication process and before the second cryptographic key distribution process.

Such first communication apparatus 20 notifies management communication apparatus 10 of two types of IP addresses in different versions from each other before the second cryptographic key distribution process. Thus, there is an increased possibility that management communication apparatus 10 notifies second communication apparatus 30 of the IP address of first communication apparatus 20 compatible in version to second communication apparatus 30 in the second cryptographic key distribution process. Therefore, the impossibility of cryptographic communication between first communication apparatus 20 and second communication apparatus 30 due to the inconsistency of IP addresses can be suppressed.

In addition, in Operation example 1, after the first authentication process, first communication unit 21 gives a first entry notice to a communication apparatus included in communication system 100 other than first communication apparatus 20, and notifies management communication apparatus 10 of the second IP address by the first entry notice.

Such first communication apparatus 20 can notify management communication apparatus 10 of the second IP address by the first entry notice.

In addition, in Operation example 2, first communication unit 21 notifies management communication apparatus 10 of the second IP address by the request for the inter-node cryptographic key after the first authentication process.

Such first communication apparatus 20 can notify management communication apparatus 10 of the second IP address by the request for the internode cryptographic key.

Other Embodiments

Although the embodiments have been described above, the present invention is not limited to the above embodiments.

For example, an example in which the communication system is realized as a HEMS has been described in the above embodiment, but the communication system may be realized as another system such as a BEMS (Billing Energy Management System) or a FEMS (Factory Energy Management System).

In addition, the first IP address is an IPv6 compatible IP address and the second IP address is an IPv4 compatible IP address in the above embodiment, but it is only needed that the first IP address and the second IP address are a plurality of IP addresses in different versions from each other. Each of the first IP address and the second IP address may be an IP address in an existing other version, or may be an IP address in a new version to be used in the future.

In addition, the communication method between the apparatuses in the above embodiment is not particularly limited. Wireless communication may be performed or wired communication may be performed between the apparatuses. In addition, wireless communication and wired communication may be combined between the apparatuses. In addition, when two apparatuses communicate with each other in the above embodiment, a relay apparatus (not shown) may be interposed between the two apparatuses.

In addition, the order of processes described in the sequence diagram of the above embodiment is an example. The order of the plurality of processes may be changed, and the plurality of processes may be executed in parallel. In addition, in the above embodiment, another processing unit may execute the process executed by the specific processing unit.

In addition, in the above embodiment, each component may be realized by executing a software program suitable for each component. Each component may be realized by a program execution unit such as a CPU or a processor reading out and executing a software program recorded on a recording medium such as a hard disk or a semiconductor memory.

In addition, each component may be realized by hardware. For example, each component may be a circuit (or integrated circuit). These circuits may form one circuit as a whole, or may be separate circuits from each other. In addition, each of these circuits may be a general-purpose circuit or a dedicated circuit.

In addition, general or specific aspects of the present invention may be realized by a system, an apparatus, a method, an integrated circuit, a computer program, or a recording medium such as a computer-readable CD-ROM. In addition, they may be realized by any combination of a system, an apparatus, a method, an integrated circuit, a computer program, and a recording medium.

For example, the present invention may be realized as a cryptographic key distribution method executed by a computer, or may be realized as a program for causing a computer to execute such a cryptographic key distribution method. In addition, the present invention may be realized as a computer-readable non-temporary recording medium on which these programs are recorded.

In addition, forms obtained by making various modifications to each embodiment that can be conceived by those skilled in the art, or other forms realized by arbitrarily combining the structural components and functions in each embodiment, without materially departing from the spirit of the present invention, are also included in the scope of the present invention.

REFERENCE MARKS IN THE DRAWINGS 10 management communication apparatus
11 communication unit
12 information processing unit
13 storing unit
20 first communication apparatus
21 first communication unit
30 second communication apparatus
31 second communication unit
100 communication system

The invention claimed is:

1. A communication system, comprising:
a management communication apparatus;
a first communication apparatus; and
a second communication apparatus,
wherein the first communication apparatus is capable of communicating using a plurality of Internet Protocol (IP) addresses in different versions from each other,
the first communication apparatus sends a discovery request, and the management communication apparatus receives the discovery request;
wherein the first communication apparatus receives a discovery response from the management communication apparatus,
the first communication apparatus and the management communication apparatus start a first authentication process;
wherein the first authentication process includes a mutual authentication process between the first communication apparatus and the management apparatus;
the first communication apparatus includes a first communication unit configured to notify the management communication apparatus of a first IP address among the plurality of IP addresses in the first authentication process for entering the communication system, and to notify the management communication apparatus of a second IP address among the plurality of IP addresses after the first authentication process, and
the management communication apparatus includes: a communication unit configured to obtain a request for a cryptographic key for performing cryptographic communication between the first communication apparatus and the second communication apparatus; and an information processing unit configured to perform, in response to the request for the cryptographic key obtained, a first cryptographic key distribution process for distributing the cryptographic key to the first communication apparatus and a second cryptographic key distribution process for distributing the cryptographic key to the second communication apparatus;

the management communication apparatus includes:
a communication unit configured to obtain a request for a cryptographic key for performing cryptographic communication between the first communication apparatus and the second communication apparatus; and
an information processing unit configured to perform, in response to the request for the cryptographic key obtained, a first cryptographic key distribution process for distributing the cryptographic key to the first communication apparatus and a second cryptographic key distribution process for distributing the cryptographic key to the second communication apparatus.

2. The communication system according to claim 1, wherein the first communication unit is configured to notify the management communication apparatus of the second IP address after the first authentication process and before the second cryptographic key distribution process.

3. The communication system according to claim 1, wherein the first communication unit gives a first entry notice to a communication apparatus included in the communication system other than the first communication apparatus after the first authentication process, and
the first communication unit is configured to notify the management communication apparatus of the second IP address by the first entry notice.

4. The communication system according to claim 3, wherein a second authentication process for the second communication apparatus to enter the communication system is performed between the second communication apparatus and the management communication apparatus,
the information processing unit is configured to select, from the first IP address and the second IP address, an IP address identical in version to an IP address of the second communication apparatus that is notified in the second authentication process, in the second cryptographic key distribution process, and
the communication unit is configured to notify the second communication apparatus of the IP address selected in the second cryptographic key distribution process.

5. The communication system according to claim 1, wherein the first communication unit is configured to notify the management communication apparatus of the second IP address in response to the request for the cryptographic key after the first authentication process.

6. The communication system according to claim 5, wherein the second communication apparatus includes a second communication unit configured to give a second entry notice to a communication apparatus included in the communication system other than the second communication apparatus after a second authentication process for entering the communication system, which is performed between the second communication apparatus and the management communication apparatus, and
the first communication unit is configured to notify the management communication apparatus of the second IP address by the request for the cryptographic key when it is determined that a version of an IP address of the second communication apparatus notified by the second entry notice is different from a version of the first IP address.

7. The communication system according to claim 5 or 6, wherein the management communication apparatus further includes a storing unit configured to store the first IP address notified in the first authentication process, and the information processing unit is configured to update the first IP address stored in the storing unit to the second IP address when the second IP address is notified.

8. A cryptographic key distribution method performed by a communication system including a management communication apparatus, a first communication apparatus, and a second communication apparatus, communicating, whereby the first communication apparatus is capable of using a plurality of IP addresses in different versions from each other, sending by the first communication apparatus a discovery request, and receiving by the management communication apparatus the discovery request;

receiving by the first communication apparatus a discovery response from the management communication apparatus, starting by the first communication apparatus and the management communication apparatus a first authentication process;

wherein the first authentication process includes a mutual authentication process between the first communication apparatus and the management apparatus;

the cryptographic key distribution method comprising:
notifying the management communication apparatus of a first IP address among the plurality of IP addresses in the first authentication process for entering the communication system, and notifying the management communication apparatus of a second IP address among the plurality of IP addresses after the first authentication process, the notifying being executed by the first communication apparatus;

obtaining a request for a cryptographic key for performing cryptographic communication between the first communication apparatus and the second communication apparatus, the obtaining being executed by the management communication apparatus; and performing, in response to the request for the cryptographic key obtained, a first cryptographic key distribution process for distributing the cryptographic key to the first communication apparatus and a second cryptographic key distribution process for distributing the cryptographic key to the second communication apparatus, the performing being executed by the management communication apparatus.

9. A management communication apparatus used in a communication system including a first communication apparatus and a second communication apparatus, wherein the first communication apparatus is capable of communicating using a plurality of IP addresses in different versions from each other, and the first communication apparatus sends a discovery request, and the management communication apparatus receives the discovery request;

wherein the first communication apparatus receives a discovery response from the management communication apparatus, the first communication apparatus and the management communication apparatus start a first authentication process;

wherein the first authentication process includes a mutual authentication process between the first communication apparatus and the management apparatus;

the management communication apparatus includes:
a communication unit configured to (a) receive a notice of a first IP address from the first communication apparatus among the plurality of IP addresses in the first authentication process for entering the communication system, (b) receive a notice of a second IP address from the first communication apparatus among the plurality of IP addresses after the first authentication process, and (c) obtain a request for a cryptographic key for performing cryptographic communication between the first communication apparatus and the second communication apparatus; and an information processing unit configured to perform, in response to the request for the cryptographic key obtained, a first cryptographic key distribution process for distributing the cryptographic key to the first communication apparatus and a second cryptographic key distribution process for distributing the cryptographic key to the second communication apparatus.

10. The management communication apparatus according to claim 9,
wherein the communication unit is configured to receive the notice of the second IP address after the first authentication process and before the second cryptographic key distribution process.

11. The management communication apparatus according to claim 9,
wherein the first communication apparatus performs a first entry notice to a communication apparatus included in the communication system other than the first communication apparatus after the first authentication process, and
the communication unit configured to receive the notice of the second IP address by the first entry notice.

12. The management communication apparatus according to claim 9,
wherein the communication unit configured to receive the notice of the second IP address by the request for the cryptographic key after the first authentication process.

13. A communication apparatus included in a communication system,
wherein the communication apparatus is capable of communicating using a plurality of Internet Protocol (IP) addresses in different versions from each other,
the first communication apparatus sends a discovery request, and the management communication apparatus receives the discovery request;
wherein the first communication apparatus receives a discovery response from the management communication apparatus,
the first communication apparatus and the management communication apparatus start a first authentication process;
wherein the first authentication process includes a mutual authentication process between the first communication apparatus and the management apparatus;
the communication apparatus includes a communication unit configured to notify a management communication apparatus of a first IP address among the plurality of IP addresses in the first authentication process for entering the communication system, and to notify the management communication apparatus of a second IP address among the plurality of IP addresses after the first authentication process, the communication unit is configured to send a request for a cryptographic key for performing cryptographic communication between the communication apparatus and other communication apparatuses included in the communication system to the management communication apparatus, and the management communication apparatus performs, in response to the request for the cryptographic key obtained, a first cryptographic key distribution process for distributing the cryptographic key to the communication apparatus and a second cryptographic key distribution process for distributing the cryptographic key to the other communication apparatuses.

14. The communication apparatus according to claim 13, wherein the communication unit is configured to notify the management communication apparatus of the second IP address after the first authentication process and before the second cryptographic key distribution process.

15. The communication apparatus according to claim 13, wherein the communication unit is configured to give a first entry notice to a communication apparatus included in the communication system other than the first communication apparatus after the first authentication process, and the communication unit is configured to notify the management communication apparatus of the second IP address by the first entry notice.

16. The communication apparatus according to claim 13, wherein the communication unit is configured to notify the management communication apparatus of the second IP address by the request for the cryptographic key after the first authentication process.

* * * * *